(12) United States Patent
Cruickshank et al.

(10) Patent No.: US 7,802,149 B2
(45) Date of Patent: Sep. 21, 2010

(54) NAVIGATING TRACE DATA (75) Inventors: Brian Cruickshank, Oakville (CA); Oliver P. Sohm, Toronto (CA); Manisha Agarwala, Richardson, TX (US); Gary L. Swoboda, Sugar Land, TX (US)

(73) Assignee: Texas Intruments Incorporated, Dallas, TX (US)

( * ) Notice: Subject to any disclaimer, the term of this patent is extended or adjusted under 35 U.S.C. 154(b) by 347 days.

(21) Appl. No.: 11/383,474

(22) Filed: May 15, 2006

(65) Prior Publication Data
US 2006/0259827 A1   Nov. 16, 2006

Related U.S. Application Data (60) Provisional application No. 60/681,427, filed on May 16, 2005, provisional application No. 60/681,557, filed on May 16, 2005.

(51) Int. Cl.
*G06F 11/00* (2006.01)

(52) U.S. Cl. .......................................... 714/45; 714/37

(58) Field of Classification Search .................. 714/45, 714/30, 33, 34, 37, 38; 717/124–128
See application file for complete search history.

(56) References Cited

U.S. PATENT DOCUMENTS

| | | | | |
|---|---|---|---|---|
| 6,658,416 | B1 * | 12/2003 | Hussain et al. | 707/10 |
| 6,988,263 | B1 * | 1/2006 | Hussain et al. | 717/128 |
| 7,069,176 | B2 * | 6/2006 | Swaine et al. | 702/176 |
| 2002/0111785 | A1 * | 8/2002 | Swoboda et al. | 703/28 |
| 2002/0188831 | A1 * | 12/2002 | Jackson et al. | 712/227 |
| 2004/0117607 | A1 * | 6/2004 | Swoboda | 713/1 |
| 2005/0278635 | A1 * | 12/2005 | Zhu et al. | 715/723 |
| 2006/0233122 | A1 * | 10/2006 | Bowers | 370/266 |

* cited by examiner

*Primary Examiner*—Dieu-Minh Le
(74) *Attorney, Agent, or Firm*—Robert D. Marshall, Jr.; W. James Brady; Frederick J. Telecky, Jr.

(57) ABSTRACT

Navigating trace data. A traced program, or the operating system responsible for the traced program, writes index values to a particular hardware location, which index values become part of the trace data by operation of hardware devices in the target system. A debug-trace program (executed either in an attached host computer or as an embedded debugger) uses the index values to assist the user of the debug-trace program in navigating to particular portions of the trace data based on the index values.

19 Claims, 6 Drawing Sheets

| Address | Hex | | Instruction | Operands | Comment |
|---|---|---|---|---|---|
| 00008568 | 00008000 | | NOP | | |
| 0000856C | 040403E2 | | MVC.S2 | 5,CSR | |
| 00008570 | 000000AB | | MVK.S2 | 0x0001,B0 | |
| 00008574 | 02A3CF5A | \|\| | AND.L2 | -2,B8,B5 | |
| 00008578 | 009403A2 | | MVC.S2 | B5,CSR | |
| 0000857C | 22903224 | [B0] | LDB.D1T1 | *++A4[0x1],A5 | L1D RM, WB Flush, 0x12345678, 10 stalls |
| 00008580 | 02900942 | | MV.D2 | B4,B5 | |
| 00008584 | 03946CA2 | | SHL.S2 | B5,0x3,B7 | |
| 00008588 | 029CBA42 | | ADDAH.D2 | B7,B5,B5 | |
| 0000858C | 0294B1E2 | | ADD.S2X | B5,A5,B5 | |
| 00008590 | 018428C1 | | ZERO.D1 | A3 | |
| 00008594 | 00800943 | | MV.D2 | B0,B1 | |
| 00008598 | 031401E0 | | ADD.S1 | A0,A5,A6 | |
| 0000859C | 41982214 | [B1] | LDBU.D1T1 | *++A6[0x1],A3 | Crosspath, 1 stall |
| 000085A0 | 00006000 | | NOP | 4 | |
| 000085A4 | 0298A843 | | ADD.D2 | B6,B5,B5 | |
| 000085A8 | 008C87A0 | | AND.S1 | 4,A3,A1 | |
| 000085AC | 22140943 | [B0] | MV.D2 | B5,B4 | L1P MISS, 8 stalls; B1 = 1 |
| 000085B0 | 900425E2 | [!A1] | ZERO.S2 | B0 | |
| 000085B4 | 2FFFFF91 | [B0] | B.S1 | 0x859C | |
| 000085B8 | 22903224 | [B0] | LDB.D1T1 | *++A4[0x1],A5 | DMA completion int; B0 = 0 |
| 000085BC | 00000000 | | NOP | | |

NAVIGATING TRACE DATA

CROSS-REFERENCE TO RELATED APPLICATIONS

This application claims the benefit of Provisional Application Ser. No. 60/681,427 filed May 16, 2005, entitled "Debugging Software-Controlled Cache Coherence," and Provisional Application Ser. No. 60/681,557, filed May 16, 2005, entitled, "Trace With Embedded Custom Debug Information", both of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data The trace data may comprise data such as addresses of the sequence of operational codes (opcodes) executed by the processor, values of various processor registers at each executed opcode, and information in log files written by the traced program.

The high speeds at which processors operate can cause the volume of trace data that is capture to become overwhelming. For example, a processor core executing at over a GigaHertz produces billions of events in just one second of trace data capture. Thus, while the information the programmer is seeking to assist in debugging a program may be present in the trace data, locating the information in a file with over a billion captured events is difficult.

SUMMARY

The problems noted above are solved in large part by a system to navigate trace data. At least some of the illustrative embodiments are a computer readable medium storing software debugger program that, when executed by a processor, cause the processor to obtain trace data generated during execution of a traced program, correlate the trace data to an object code version of the traced program to created correlated trace data, and display a portion of correlated trace data on a display device (the portion selectable by a user of the software debugger program based on index values inserted into the trace data).

Other illustrative embodiments are a computer readable medium storing programs that, when executed by a processor, causes the processor to insert an index value into a stream of trace data, the index value used to index into the trace data.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
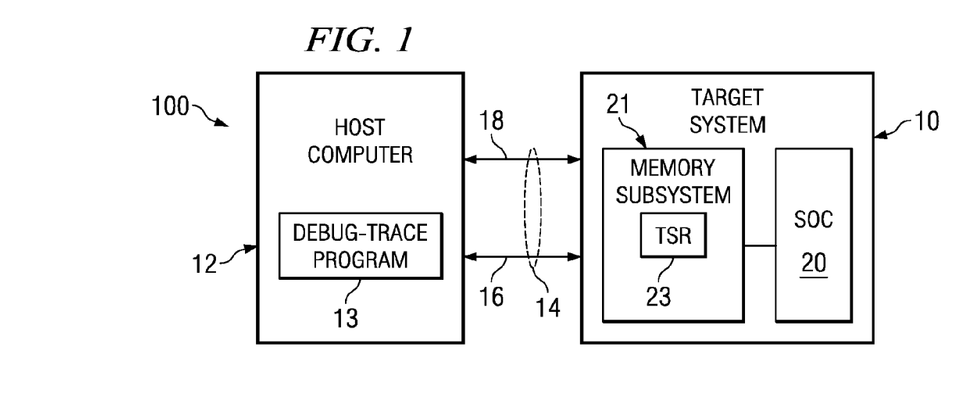
FIG. 1 shows a system in accordance with embodiments of the invention.

FIG. 1 illustrates a software development system 100 in accordance with embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer 12 stores and executes a program that is used for software debugging (e.g., gather trace data and produce trace displays), and thus is referred to herein as a software debugger program or a debug-trace program 13.

The host computer 12 and target system 10 couple by way one or more interconnects 14, such as cables. In some embodiments, the host computer 12 couples to target system 10 by way of a multi-pin cable 16, such as a Mictor available from Tektronix Texas, LLC of Richardson, Tex. The multi-pin cable 16 enables transfer of trace data files from the target system 10 to the host computer 12. In alternative embodiments, the host computer 12 couples to the target system 10 by way of a serial cable 18 across which the host computer 12 may communicate with a serial communication system of target system 10 (e.g., a joint test action group (JTAG) communication system or a serial direct memory accesses (DMA) transfer protocol). Serial communication between the host computer 12 and target system 10 has lower bandwidth than a multi-pin connection through illustrative cable 16. Thus, in embodiments that rely exclusively on the serial communications, rather than trace or capture every event of a processor within a particular time frame, the statistical sample system (discussed more fully below) of the target system 10 is configured to statistically sample pertinent information, and transfer the statistically sampled data across the communication cable 18. In order to reduce the number of cables required to couple the host computer with the target system, the multi-pin cable 16 may have two or more pins dedicated real-time serial data streams, and thus the host computer 12 and target system 10 may communicate using different protocols, yet over the same multi-pin cable 16.

Figure 2:
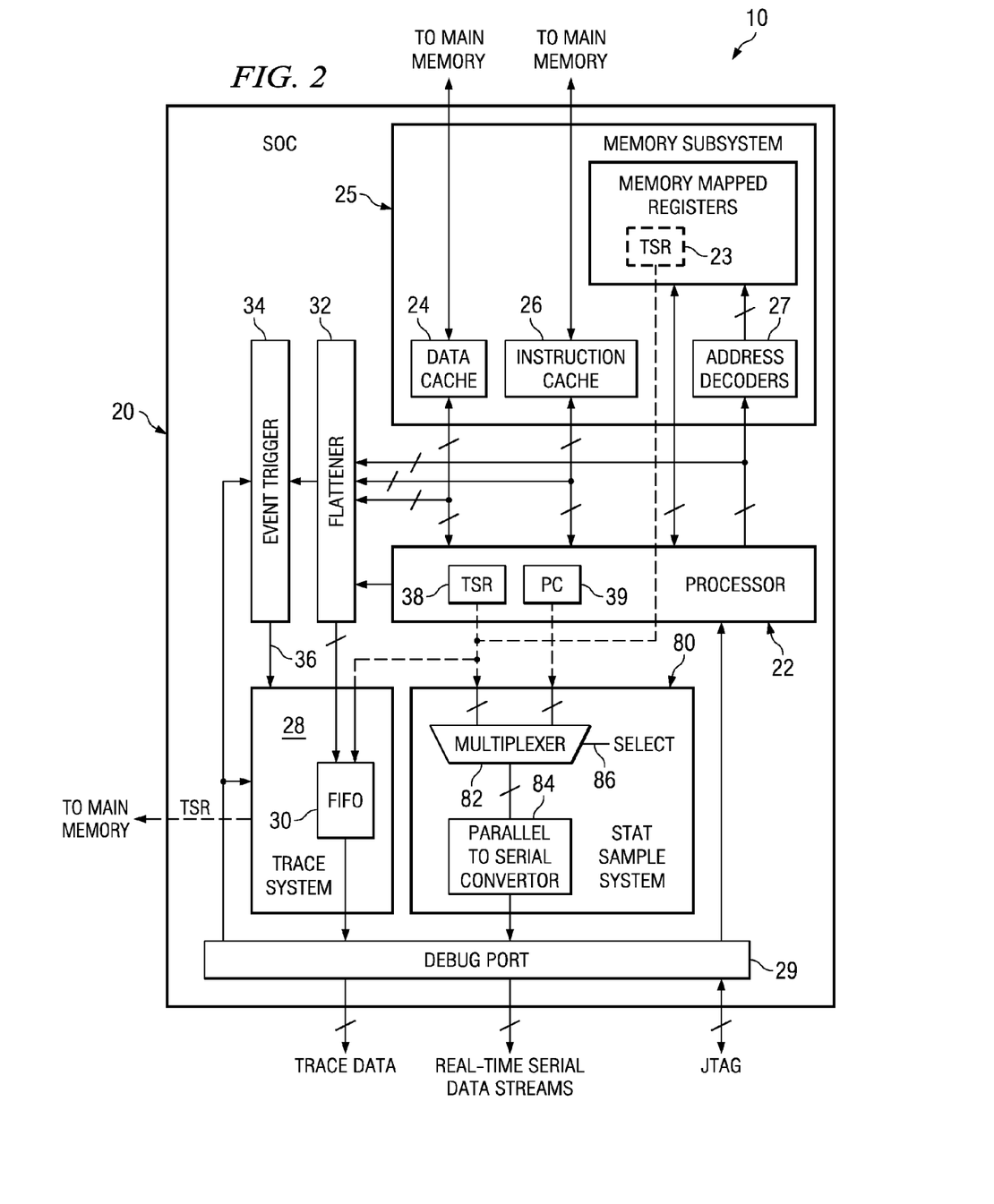
FIG. 2 shows, in greater detail, a target system in accordance with embodiments of the invention.

FIG. 2 shows in greater detail a portion of the target system 10. In particular, a target system 10 in accordance with embodiments of the invention comprises a System-On-A-Chip (SOC) 20. The SOC 20 is so named because many devices that were previously individual components are integrated on a single integrated circuit. For example, the SOC 20 may comprise one or more processors 22, and a memory subsystem 25 that comprises a data cache 24, an instruction cache 26 and an address decoder 27. The SOC 20 may comprise other devices as well, such as random access memory (RAM), and memory controllers. In accordance with embodiments of the invention, the SOC 20 also comprises a trace system 28. The trace system 28 comprises a First In-First Out buffer (FIFO) 30 in which trace data is gathered. The trace data from FIFO 30 is sent to the host computer 12 (FIG. 1) by the trace system 28 through a debug port 29. Because the processor 22 may perform a plurality of parallel operations, the SOC 20 also comprises a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener 32 may read, serialize and then provide to the FIFO buffer 30 is: direct memory access (DMA) trace data; cache memory trace data; addresses of opcodes executed by the processor 22; the value of hardware registers in the processor 22; and interrupts received by the processor 22.

Still referring to FIG. 2, the integrated circuit SOC 20 further comprises an event trigger system 34. The event trigger system 34 couples to the data flattener 32 and receives a least a portion of the serialized data. In response to various pre-programmed triggers (where such triggers may be communicated to the event trigger system 34 by serial communications through the debug port 29), the event trigger system 34 asserts a trigger signal 36 to the trace system 28. In response, the trace system 28 accumulates trace data in its FIFO buffer 30 (the data arising just after the assertion of the trigger signal 36) and sends the trace data to the host computer 12 (FIG. 1). In some embodiments the trace system 28 additionally compresses the trace data from the FIFO buffer 30 prior to sending the trace data to the host computer 12.

Referring simultaneously to FIGS. 1 and 2, a user of the host computer 12 wishing to debug a software program executable on the target system 10 enables the event trigger system 34. Thereafter, the user initiates the target program on the target system 10. The processor 22 executes the target program, while the data flattener 32 gathers pertinent information, serializes that information, and forwards the pertinent information both the event trigger system 34 and the trace system 28. At points in time before the trace system 28 is enabled by the event trigger system 34, the data supplied to the trace system 28 by the flattener 22 may be ignored or discarded. At a point in execution of the target program, the trigger events occur and the trigger events are identified by the event trigger system 34. The event trigger system 34 asserts the trigger signal 36 to the trace system 28. In response, the trace system 28 collects the trace data in the FIFO buffer 30. Simultaneously with the collecting, the trace system 28 sends the trace data to the host computer 12. In embodiments where all, or substantially all, the events after the assertion of the trigger signal 36 are part of the trace data, the trace system 28 sends the trace data over the relatively high bandwidth multi-pin cable 16. In yet still other embodiments, sending of the trace data from the target system 10 to the host computer 12 may be accomplished by sending data over the serial cable 18 and the relatively high bandwidth multi-pin cable 16. Other embodiments comprise sending the data over an optical interconnect to the host computer, over a local area network (LAN) or the Internet, or logging the captured trace data in a memory or disk that is accessible by the target processor where it can be accessed by another program running on the target processor (e.g., accessed by an embedded software debugging program).

Still referring to FIG. 2, the speed at which the processor 22 operates means that the volume of trace data may be significant. For example, a processor circuit 22 having a core frequency over 1.0 GigaHertz may result in trace data having over a billion events for a trace time of only one second. In order to assist the user of the host computer 12 in finding the pertinent events and in accordance with embodiments of the invention, the trace system 28 is configured to insert into the trace data various index values (written by either the operating system of the target system 10 or the application program executing on the target system 10). The debug-trace program 13, executing on the host computer 12, receives the trace data including the various index values, and enables the user to select portions of the trace data to display using the index values. The discussion now turns to various mechanisms for insertion of the index value, followed by a plurality of illustrative situations where the index value may be used.

Still referring to FIG. 2, the trace system 28 obtains the index value from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register may, in actuality, be supplied to the trace system after passing through the data flattener 32. A hardware register in the processor 22 may be equivalently referred to as an opcode addressable register. In alternative embodiments, the target state register may be a register outside the processor. For example, the processor 22 may couple to a memory subsystem 25 which implements the target state register 23. In these alternative embodiments, the target state register 23 may be readable by a memory operation to an assigned address, and thus target state register 23 may be referred to as a memory addressable or memory mapped register. In yet still other embodiments, a memory subsystem 21 may be separate from yet coupled to the SOC 20 (FIG. 1).

The trace system 28 is configured to send the value in the target state register 23, 38 along with the trace data only when the value in the target state register 23, 38 is newly written. Once the target state register has been newly written and not yet read, it becomes the highest priority data item for the trace system 28 to capture, preempting other types of data. If the trace stream is disabled for a period of time (e.g., while waiting for a trigger to occur or while waiting for the debugging system to initiate a read of the information), attributing higher priority to the information in the target state register 23, 38 ensures that the last value written into the target state register will be presented first in the trace stream once trace data capture is again active. In embodiments where the trace system 28 couples to the host computer 12 by way of the relatively high bandwidth connection, the trace system 28 is configured to send the value to the host computer system 12 in a message wrapping protocol that identifies to the host computer 12 that the information is the value of the target state register. Other systems for differentiating values of the target state register from other trace data may be equivalently used.

Figure 3:
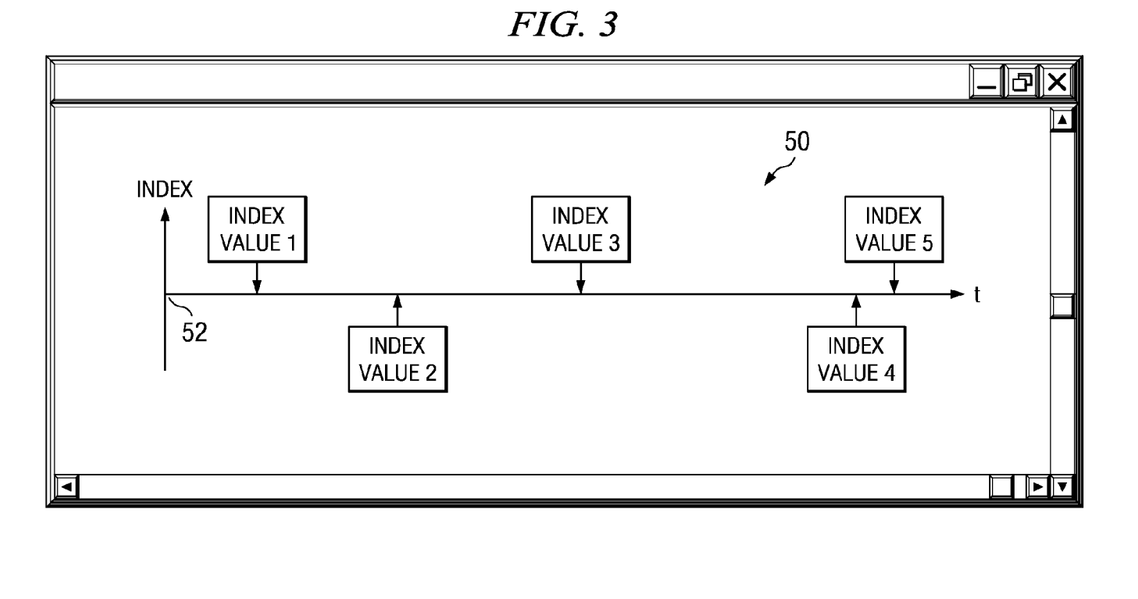
FIG. 3 shows a "dashboard" for indexing into trace data based on index values.
Figure 4:
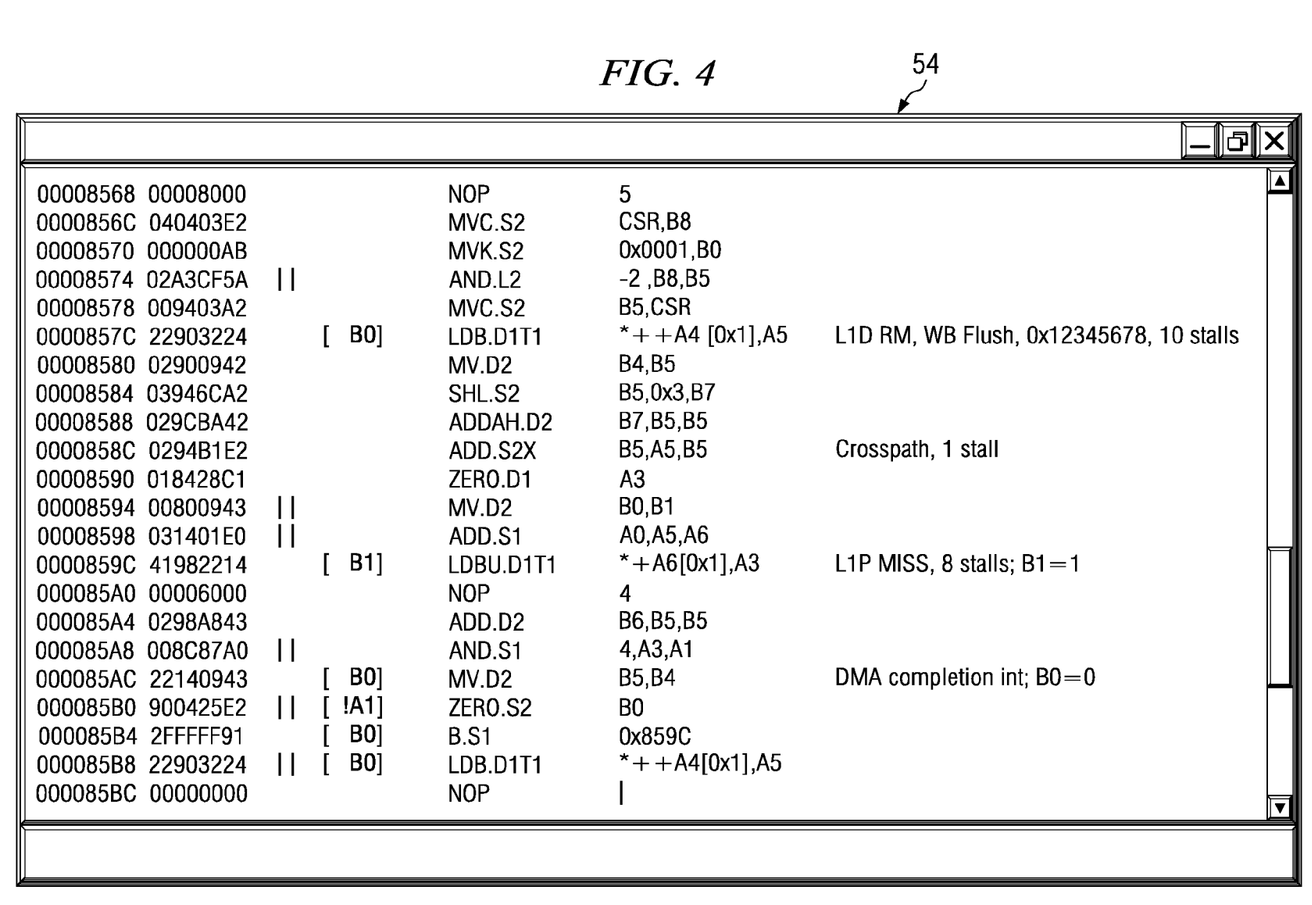
FIG. 4 an illustrative trace data screen.

FIG. 3 illustrates a debug-trace program "dashboard" to assist a user in navigating to a portion of the traced data. In particular, FIG. 3 shows a timeline 50 that has a starting point 52 (e.g., the beginning of the trace capture). As the trace capture continues, the various traced program(s) or the operating system of the target system 10 write index values into the target state register, which index values are then transferred out with the remaining trace data. The illustrative dashboard of FIG. 3 shows five index values during the trace period, but any number of index values may be equivalently used. By selecting one of the index values in the dashboard, the debug-trace program navigates the user to the trace events proximate in time to the index value. In some embodiments, selecting the index value navigates the user to the trace events that occur just after the index value. In other embodiments, selecting an index value takes the user to the trace events just prior to the index value. In yet still other embodiments, selecting an index value shows the trace events leading up to and just after the index value. FIG. 4 shows an illustrative set of set trace data 54. Referring simultaneously to FIGS. 3 and 4, selecting one of the index values from FIG. 3, in accordance with embodiments of the invention, brings up a window of trace data similar to that of FIG. 4, without the user having to scroll through possibly billions of events in the captured traced data.

In the embodiments illustrated by the dashboard of FIG. 3, the index values may written to the target state register 23, 38 by a portion of the operating system. For example, the task switching portion of the operating system of the target processor may write the index values each time an executing task is preempted for a higher priority task. The index values may also be written by the traced program itself. For example, the traced program may write the index values each time a function within a particular task is called.

Figure 5:
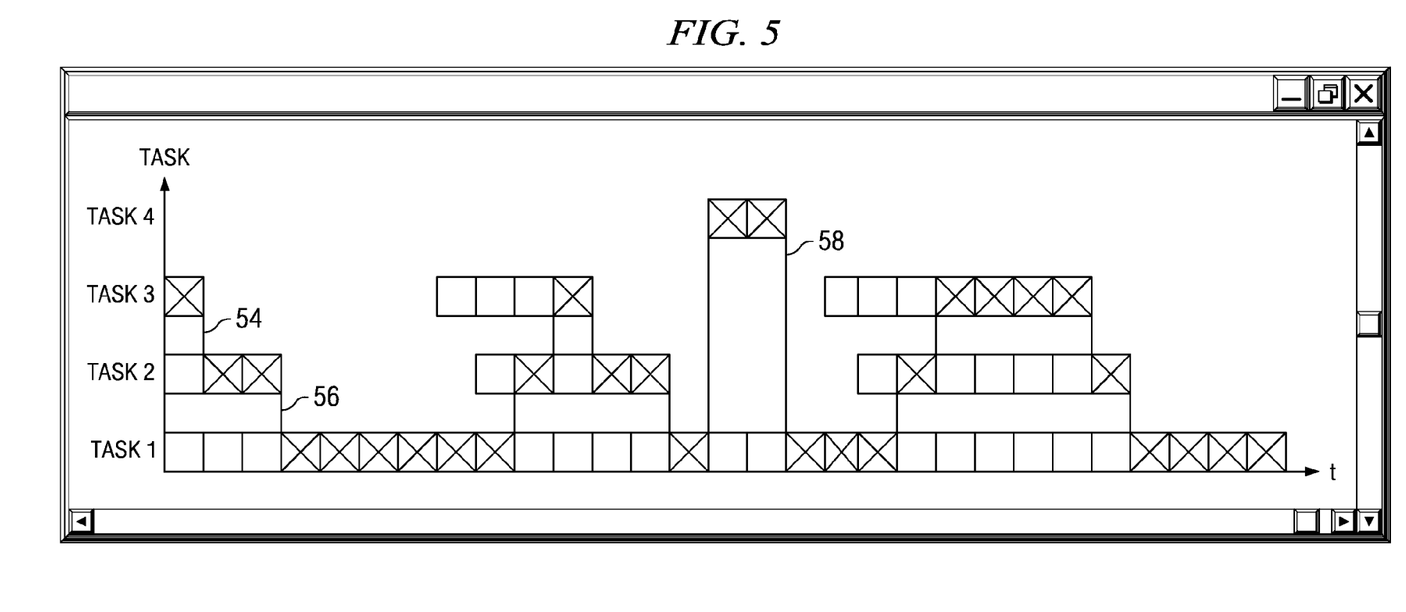
FIG. 5 shows a "dashboard" for selecting a portion of a trace data to display based on kernel state changes.

FIG. 5 illustrates yet still further embodiments where a dashboard in the debug-trace program is used to indicate kernel program state changes as a navigation aid into the trace data. In particular, FIG. 5 illustrates a task-level view of the activity of the traced processor during the trace period. In the illustrative dashboard, task 1 is an active task throughout the trace period; however, task 1 is only executed for a smaller portion of the overall trace period, as indicated by the time slices having an "X" therein. Task switches are illustrated by vertical lines (e.g., vertical lines 54, 56 and 58). Thus, the illustrative dashboard of FIG. 5 allows the user to index into the trace data as a function of the particular executed task. In these embodiments the kernel program responsible for time-slicing of the processor writes to the target state register the task number each time a new task is started. The debug-trace program, using the index value written by the kernel program, makes the illustrative dashboard of FIG. 5 to assist the user in indexing into to trace data.

In some embodiments, indexing into the trace data using the illustrative dashboard of FIG. 5 involves selecting one of the vertical lines indicative of a task switch. For example, selecting the vertical line 54 directs the trace program to display the portion of the trace data that begins the execution of task 2. As another example, selecting the vertical line 58 directs the trace program to display the portion of the trace data associated with task 4. Thus, selecting one of the vertical lines enables the debug-trace program to display the relevant portions of the trace data. The illustrative embodiments of FIG. 5 are particularly useful in situations where multiple instances of the same program code are executing such that it is difficult, by viewing just the raw trace data, to determine which instantiation of a particular portion of code the user is viewing. For example, for a program performing a multi-channel decode operation (where each decode program is substantially the same yet operating on different data streams), the illustrative dashboard of FIG. 5 that shows the kernel program state changes easily and efficiently allows the user of the debug-trace program to identify the particular channel for which further debugging is desired. Another useful application of the type of dashboard shown in FIG. 5 is to diagnose time-critical applications where a task was not able to complete all of its required operations in a timely manner. The dashboard enables the user to quickly navigate to the point in the trace stream where the time slice in which the task was given to implement its operations expired, and is thus able to more easily locate the captured trace events that show the functions and events (e.g., unexpected interrupts or error conditions) that were consuming the task's time allocation prior to the expiration of the time slice for the task.

Figure 6:
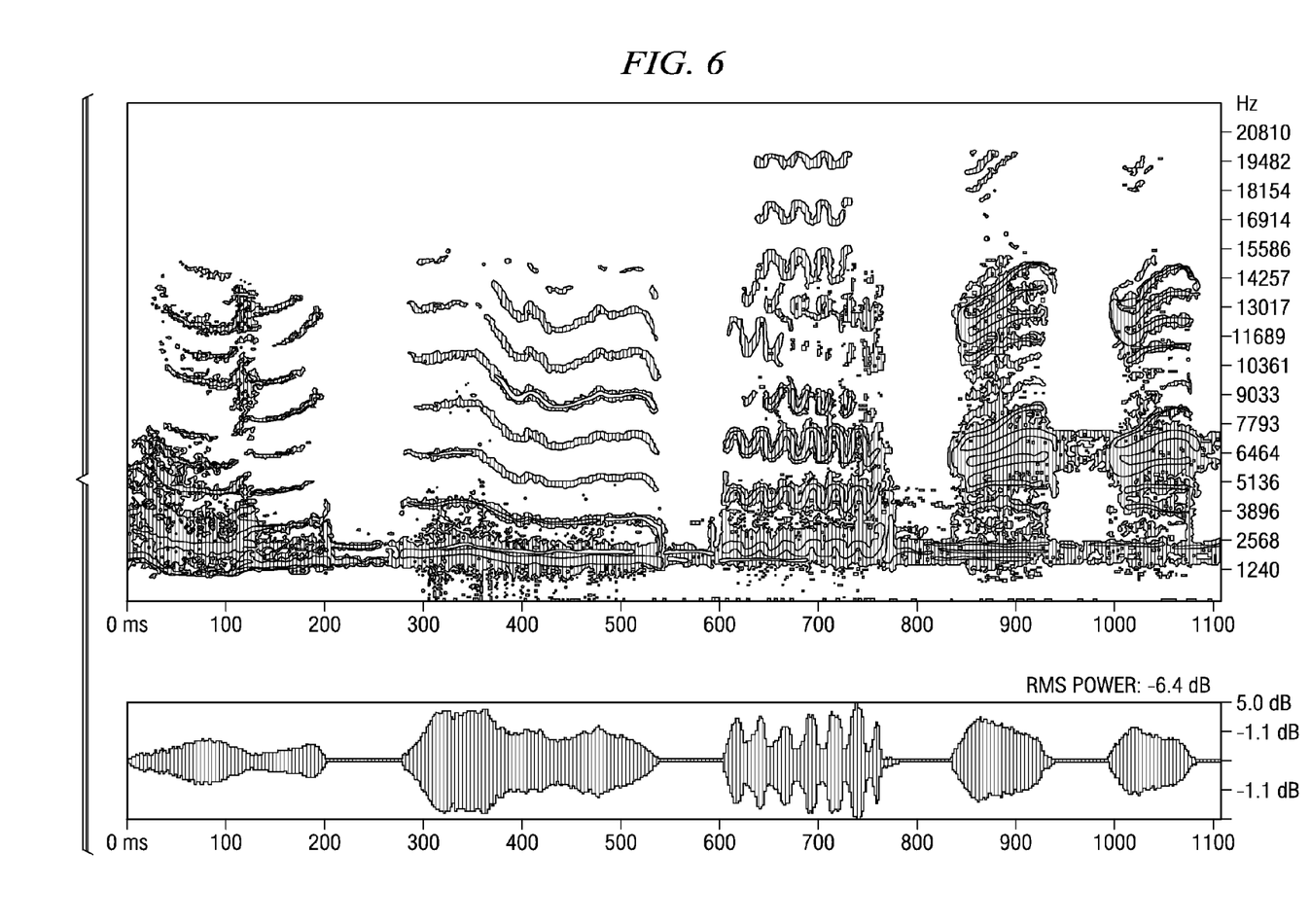
FIG. 6 shows a "dashboard" for selecting a portion of the trace data to display based on an illustrative audio reproduction.

FIG. 6 shows yet still further alternative embodiments of a dashboard used to index into trace data. In situations where the trace program is operating on streaming media (e.g. audio or video), indexing into the trace data to the event or events where the user would like to perform further debugging operations is difficult. In order to address these difficulties the debug-trace program allows the user to rely on visual or auditory senses to help identify the location in the steaming media where a shortcoming is noted, and to further identify the portion of the trace data that correlates to the anomaly. FIG. 6 illustrates an audio signal as a function of time and signal amplitude. In accordance with these embodiments, the debug trace program, having the raw streaming data available to it as part of the trace capture mechanism, produces the output signal originally generated by the traced program and allows the user to index into the traced data based on the production, or reproduction. Although FIG. 6 shows graphically the production of the audio signal, in accordance alternative embodiments the trace program also reproduces the audio as well. When the user of the trace program detects the portion of the illustrative audio stream where further investigation is needed, the user selects that portion of the audio which then displays the corresponding portion of the trace data. In order to perform indexing in this fashion, the traced program inserts an index value into the trace data (by way of the target state register) which is indicative of its location in the streaming media. In some embodiments, the traced program inserts an index value that is indicative of the frame number of the streaming media (e.g., audio steam, video steam, or data stream). Thus, selection of a particular portion of the illustrative audio steam indicates a frame number and based on the frame number the debug-trace program displays the corresponding trace data.

Although FIG. 6 is described in relation to an audio stream which produces the audio steam and a visual indication of amplitude as a function of time of the audio steam, other representations may be equivalently used. For example, with respect to the audio steam, the dashboard may produce a plot of amplitude of the audio signal as a function of frequency, which may be particularly useful in identifying out-of-band anomalies. Similarly, and as illustrated in FIG. 6, the dashboard may produce a spectrogram plot of frequency and amplitude over time. With respect to video steams, embodiments of the invention may produce each frame of the video steam on a frame-by-frame basis for the user to view, possibly at a slower than normal speed. When the video anomaly is detected by the user, selection of the particular frame where the anomaly is present may thus identify a frame number, which frame number may then be used to index into trace data for further investigation. The idea with respect to an audio steam and a video stream may be broaden to encompass any now existing or after developed data stream. Further, automatic analysis of the captured data may be used in place of the user's senses to scan through the captured data stream and automatically detect anomalies (e.g., discontinuities or 'glitches' in the data stream, packetization errors such as invalid headers or incorrect checksums, or other user-definable characteristics of the data stream) and to automatically highlight these on the dashboard with tags that, when selected by the user, open up the trace viewer at the corresponding locations in the captured trace data.

Figure 7:
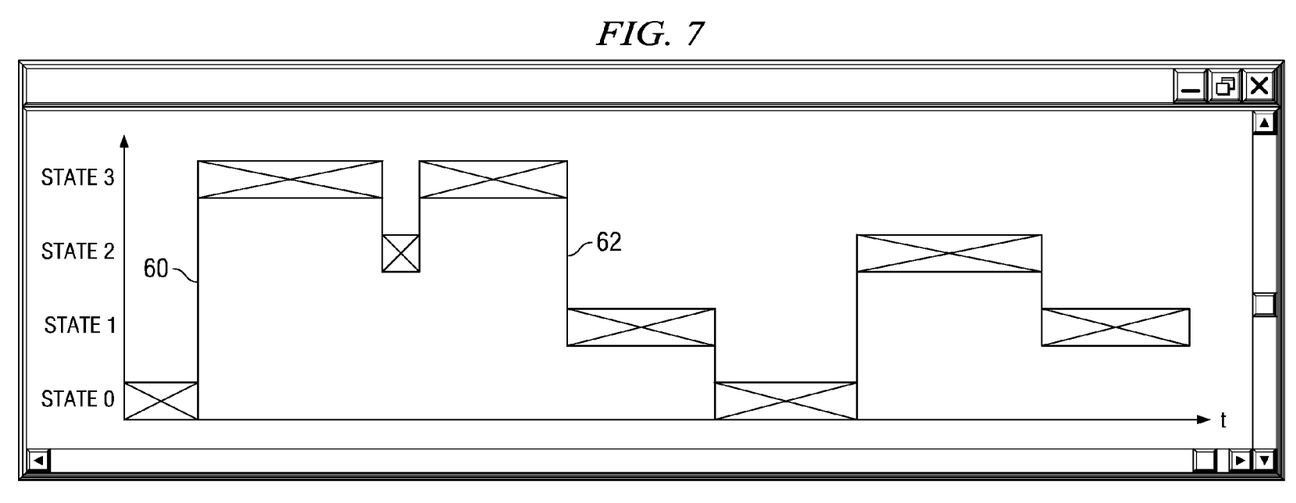
FIG. 7 shows a "dashboard" for selecting a portion of trace data to display based on the state of a software state machine.

FIG. 7 illustrates yet still another dashboard to assist the user of the trace program with indexing into the trace data as a function of the state of the software state machine. Many programs utilize state machines as the mechanism to keep track of location within a process, and to perform particular tasks at particular times. One example of a program where a state machine may be used is a telephone dialing modem where several states exist (e.g., waiting for dial tone, dialing, listening for carrier, handshaking protocols, data exchange, and the like). The illustrative dashboard of FIG. 7 enables a user of the debug-trace program to index into the trace data as a function of the state of the software state machine. In the example of FIG. 7, the software state machine has only four active states during the trace period, but any number of states may be equivalently used. The dashboard of FIG. 7 shows which states were active during the trace period and their order of activity, and the user of the debug-trace program uses the illustrative of dashboard of FIG. 7 to index to particular locations in the trace data. For example, the vertical line 60 is an indication of a change from state 0 to state 3. Likewise, the vertical line 62 shows a state change from illustrative state 3 to state 1. By selecting the vertical lines by the user the debug-trace program displays a particular portion of the trace data where the state transition took place. The portion of the trace data displayed may selectively be the trace data just after the state change, the trace data just before the state change, or possibly the displayed trace data could be centered at the point in time where the state transition occurs. Building the illustrative dashboard of FIG. 7, and indexing into the trace data, may be accomplished by the traced program writing an indication (to the target state register) that a state transition has taken place. The indication that the state transition has taken place may be used to not only generate the illustrative dashboard of FIG. 7, but also as a mechanism to index into the trace data.

The embodiments discussed to this point utilize trace data gathered by the trace system 28 and either stored in the target system for use by an embedded debugger (e.g., another processor on the SOC 20 acting as an embedded debugger), or transferred over one or both of serial cable 18 or the multi-pin cable 16 to the host computer 12; however, in alternative embodiments the SOC 20 either does not have the ability to gather all the pertinent trace data (e.g., a low cost SOC 20 that does not have the trace system 28, data flattener 32 and event trigger system 34), or the user of the debug-trace program 13 is interested in a smaller subset of the data. Referring again to FIG. 2, in accordance with alternative embodiments the SOC 20 comprises a statistical sample system 80 which enables the alternative embodiments to utilize a method termed herein "statistical profiling."

When statistical profiling, the statistical sample system 80 is configured to periodically read the value of the program counter (which contains the address of the next opcode to execute) from the program counter register 39 and send the value of the program counter to the host computer 12 or an embedded debugger. Even in situations where the addresses of the executed instructions are only periodically sample, there may be an overwhelming number of events in the statistically sampled trace data, making it difficult for a user of a debug-trace program to navigate to particular points of interest. In order to address the navigation concern, the alternative embodiments send the value in the target state register 23, 38 in place of the value of the program counter when the value (or a portion thereof) in the target state register 23, 38 is newly written.

FIG. 2 illustrates that the statistical sample system 80 comprises a multiplexer 82 and a parallel to serial converter 84. The statistical sample system 80 periodically reads a predetermined read address, in these embodiments the output signals of the multiplexer 82. The value from the predetermined read address is provided to the parallel to serial converter 84, and from there is sent to the host computer 12 (e.g., over the serial cable 18). In some embodiments the statistical sample system 80 may be "programmed" by the host computer 12 to periodically read the predetermined memory location, and thus the host computer 12 from that point forward receives the read values without further commands. In alternative embodiments, the host computer 12 may make a request (or read) for each read value.

Still referring to FIG. 2, and with regard to the value in the target state register 23, 38, the multiplexer of the statistical sample system 80 is configured to provide to the predetermined read location the value of the program counter register 39, unless the value of the target state register 23, 38 (or portion thereof) has changed since the last send of the value of the target state register. If the target state register 23, 38 has been written since the last send of the value of the target state register 23, 38, then the multiplexer select signal 86 is asserted. On the next read of the predetermined memory address, the value of the target state register is present at the output of the multiplexer 82, and thus the host system is supplied the value of the target state register 23, 38. After the read, but before the next read to the predetermined read address, the statistical sample system de-asserts the select signal 86.

Differentiating the program counter value from the value of the target state register in the host computer 12 takes advantage of the fact that in accordance with at least some embodiments the target system 10 operates based on 16 bit (two byte) instructions aligned on even byte boundaries. Thus, the value of the program counter in accordance with these embodiments consistently has an even value, meaning that the least significant bit of the program counter is zero. In order to differentiate a program counter value from a value from the target state register, the least significant bit of the value of the target state register is assigned to be a logic "1". Other systems for differentiating program counter values from values of the target state register may be equivalently used.

Using these tools, the host computer 12 (and in particular the debug-trace program 13) may obtain index values. From the index values, the debug-trace program 13 enables indexing into the instructions represented by addresses collected by the statistical sample system 80. Although not as exact as the embodiments where each executed address is captured, the embodiments performing statistical sampling still may generate and display dashboards such as illustrated in FIGS. 3, 5 and 7.

Figure 8:
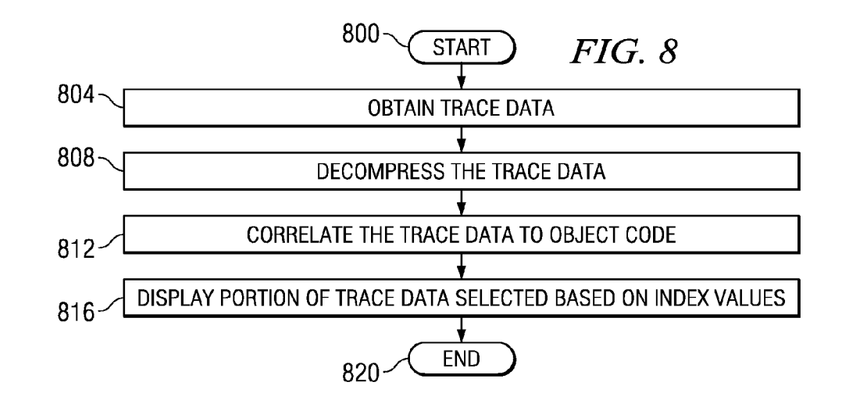
FIG. 8 shows a method in accordance with embodiments of the invention.

FIG. 8 shows a method in accordance with the embodiments of the invention. In particular, the method starts (block 800) and moves to obtaining trace data generated during the execution of a traced program. Referring briefly to FIG. 1, the host computer 12 obtains the trace data generated during the execution of the traced program in the target system 10. In some embodiments, all or substantially all the events during the trace period are captured. In other embodiments, the program counter values are periodically sampled to perform statistical profiling, and index values in the target state register 23, 38 supplement the program counter values. The trace data is compressed at the target system 10 in some embodiments, and thus the next step in the illustrative method is to decompress the trace data to create uncompressed trace data (block 808). In embodiments where the trace system 10 does not compress the trace data, the illustrative decompressing of the trace data may be omitted. Next, the illustrative method correlates the trace data received from the target system 10 to an object code version of the executed program (block 812). This illustrative correlation enables the display of trace data to show not only the executed opcodes, but also to show how the of opcodes correlate to the various tags and comments within the object code file. Thereafter, the illustrative method moves to displaying a portion of the correlated trace data on a display device, the portion displayed selectable by a user of the trace program based on index values inserted into the trace data (block 816). As discussed above, these index values, and the selection based on the index values, may take many forms. In some embodiments, the index value is indicative of application level data, such as the state of a software state machine or frame number in a steaming media. In other embodiments, the index value is indicative of kernel programs state changes, such as the task numbers for each active task switch. Thereafter, the process ends (block 820).

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention. The computer readable medium could be, for example, a volatile memory, a non-volatile memory, a compact disc read only memory (CDROM), an electrically erasable programmable read only memory (EEPROM), a hard drive, and the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-readable medium storing a debugger program that, when executed by a processor, causes the processor to:

obtain an indexed record of trace data that includes a record of trace data generated during execution of a traced program, plus index values that have been inserted into the record of trace data;

correlate the trace data to an object code version of the traced program to create correlated trace data; and display a portion of the correlated trace data on a display device, the portion selectable by a user of the debugger program based on the index values, wherein the index values are inserted into the record of trace data during execution of the traced program.

2. The computer-readable medium as defined in claim 1 wherein when the processor displays the portion of the correlated trace data, the debugger program causes the processor to display based on the user's selection of an index value, the index value indicative of a task number associated with a task switch.

3. The computer-readable medium as defined in claim 1 wherein when the processor displays the portion of the correlated trace data, the debugger program causes the processor to display based on the user's selection of an index value, the index value indicative of state of a software state machine implemented by the traced program.

4. The computer-readable medium as defined in claim 1 wherein when the processor displays the portion of the correlated trace data, the debugger program causes the processor to display based on the user's selection of an index value, the index value indicative of a location within a streaming media operated on by the traced program.

5. The computer-readable medium as defined in claim 4 wherein the index value is indicative a frame number of an audio stream.

6. The computer-readable medium as defined in claim 4 wherein the index value is indicative of a frame number of a video stream.

7. The computer-readable medium as defined in claim 4 wherein the index value is indicative of a frame number of a data stream.

8. The computer-readable medium as defined in claim 4 wherein when the processor displays based on the user's selection of the index value, the debugger program causes the processor to:

produce a representation of an output signal originally generated by the traced program based on the streaming media; and permit the user to select a portion of the representation of the output signal.

9. The computer readable medium as defined in claim 1 wherein the portion of the correlated trace data is selectable by the debugger program based on an analysis of a streaming media output generated by the traced program.

10. The computer-readable medium as defined in claim 8 wherein when the processor produces the representation, the debugger program causes the processor to perform one or more selected from the group: produce audio from a stream of audio data; produce video from a stream of video data; produce a plot of amplitude of an audio signal as a function of time; produce a plot of amplitude of an audio signal as a function of frequency; and produce a spectrogram plot of amplitude and frequency as a function of time.

11. The computer-readable medium as defined in claim 1 wherein the traced program inserts the index values.

12. A computer-readable medium storing a program that, when executed by a processor, causes the processor to insert an index value into a stream of trace data generated during execution of a traced program, the index value used, together with a visual display of activity associated with execution of the traced program, to correlate between said visual display of activity and a portion of said stream of trace data that corresponds to said visual display of activity.

13. The computer-readable medium as defined in claim 12 wherein the index value is indicative of a task number associated with a task instantiated by an operating system executed on the processor.

14. The computer-readable medium as defined in claim 12 wherein the index value is indicative of a state of a software state machine implemented in the traced program.

15. The computer-readable medium as defined in claim 12 wherein the index value is an indication of a location within a streaming media operated on by the traced program.

16. The computer-readable medium as defined in claim 15 wherein said location within a streaming media is a frame number of a video stream.

17. The computer-readable medium as defined in claim 15 wherein said location within a streaming media is a frame number of an audio stream.

18. The computer-readable medium as defined in claim 15 wherein said location within a streaming media is a frame number of a data stream.

19. The computer-readable medium as defined in claim 12 wherein the traced program inserts the index value.

* * * * *